US009622268B2

(12) United States Patent
Li et al.

(10) Patent No.: US 9,622,268 B2
(45) Date of Patent: Apr. 11, 2017

(54) RANDOM ACCESS METHOD AND RANDOM ACCESS SYSTEM FOR TERMINAL IN HIGH-SPEED MOBILE ENVIRONMENT

(71) Applicant: ZTE Corporation, Shenzhen (CN)

(72) Inventors: Lei Li, Shenzhen (CN); Xiaoxiao Liu, Shenzhen (CN); Bin Li, Shenzhen (CN); Hongfeng Qin, Shenzhen (CN); Xue Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 14/350,378

(22) PCT Filed: Aug. 7, 2013

(86) PCT No.: PCT/CN2013/081023
§ 371 (c)(1),
(2) Date: Apr. 8, 2014

(87) PCT Pub. No.: WO2013/185726
PCT Pub. Date: Dec. 19, 2013

(65) Prior Publication Data
US 2015/0163829 A1    Jun. 11, 2015

(30) Foreign Application Priority Data
Aug. 29, 2012    (CN) .......................... 2012 1 0312236

(51) Int. Cl.
H04W 74/08    (2009.01)
H04W 88/08    (2009.01)
(52) U.S. Cl.
CPC ....... *H04W 74/0833* (2013.01); *H04W 88/08* (2013.01)
(58) Field of Classification Search
CPC .................................................. H04W 74/0833
See application file for complete search history.

(56) References Cited

U.S. PATENT DOCUMENTS

2010/0074372 A1* 3/2010 Mauritz ............. H04J 13/0055
375/319
2010/0210243 A1* 8/2010 Vujcic ................. H04B 1/7073
455/411

(Continued)

FOREIGN PATENT DOCUMENTS

CN    101873714 A    10/2010
CN    102316601 A    1/2012
WO    2009039224 A1    3/2009

OTHER PUBLICATIONS

International Search Report of PCT/CN2013/081023 dated Nov. 14, 2013.

(Continued)

*Primary Examiner* — Robert M Morlan
*Assistant Examiner* — Nourali Mansoury
(74) *Attorney, Agent, or Firm* — Banner & Witcoff, Ltd.

(57)    ABSTRACT

A random access method and random access system for a terminal in a high-speed mobile environment are provided. Wherein, the method comprises: selecting a random access preamble format according to a preset cell coverage radius target value; judging whether using a restricted set of cyclic shift quantities pre-configured satisfies a requirement of the cell coverage radius target value under the selected random access preamble format; if not satisfying, selecting a cyclic shift quantity which satisfies the requirement of the cell coverage radius target value from a unrestricted set of the cyclic shift quantities pre-configured; and generating a random access signal according to the cyclic shift quantity and a pre-configured mother code, and performing access using the random access signal. Through the above-mentioned technical scheme, the embodiment of the present document (Continued)

provides a more perfect random access method and random access system for a terminal in a high-speed mobile environment.

10 Claims, 3 Drawing Sheets

(56) References Cited

U.S. PATENT DOCUMENTS

| | | |
|---|---|---|
| 2011/0086658 A1 | 4/2011 | Baldemair |
| 2011/0150156 A1 | 6/2011 | Xue et al. |
| 2012/0051292 A1* | 3/2012 | Mauritz .............. H04J 13/0055 370/328 |

OTHER PUBLICATIONS

Using Restricted Preamble Set for RACH in 1-12 High Mobility Environments, 3GPP Draft; Mobile Copetence Centre;p. 650, Route Des Lucioles; F-06921 Sophia Antipolis Cedex; France, Jun. 20, 2007. 9 pages.
Supplementary European Search Report of EP 13803583, dated Jan. 11, 2016.

* cited by examiner

RANDOM ACCESS METHOD AND RANDOM ACCESS SYSTEM FOR TERMINAL IN HIGH-SPEED MOBILE ENVIRONMENT

TECHNICAL FIELD

The present document relates to the communication field, and in particular, to a random access method and random access system for a terminal in a high-speed mobile environment.

BACKGROUND OF THE RELATED ART

Figure 1:
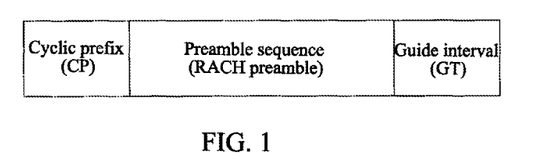
FIG. 1 is a structure diagram of a random access sub-frame.

In the Long Term Evolution (LTE) system, the random access technology is an important technology of the User Equipment (abbreviated as UE) access control in the communication system. The random access preamble of the LTE generally uses the ZC (Zadoff-Chu) sequence, and the random access preamble code is derived by selecting different cyclic shifts based on the ZC sequence. The random access subframe is made up of three parts, which respectively are a Cyclic Prefix (CP), a preamble sequence (Sequence) and a Guard Time (GT), as shown in FIG. 1.

The PRACH of the existing LTE system supports five kinds of random access preamble formats, which are Format0 to Format4, wherein, the Frequency Division Duplexing (FDD) supports format0 to format3, and the Time Division Duplexing (TDD) supports format0 to format 4; different random access preamble formats correspond to different CP lengths (TCP), Sequence lengths (or, the number of sampling points of the preamble sequence, abbreviate as TSEQ) and the GT lengths (or, the number of sampling points of the guard interval, abbreviated as TGT). The types of the random access preamble format supported by the TDD mode in the LTE system at present, and the TCP, the TSEQ and the TGT corresponding to every format are shown in Table 1.

TABLE 1

| random access preamble format | $T_{CP}$ | $T_{SEQ}$ | $T_{GT}$ |
|---|---|---|---|
| Format 0 | $3168T_s$ | $24576T_s$ | $2976T_s$ |
| Format 1 | $21024T_s$ | $24576T_s$ | $15840T_s$ |
| Format 2 | $6240T_s$ | $2*24576T_s$ | $6048T_s$ |
| Format 3 | $21024T_s$ | $2*24576T_s$ | $21984T_s$ |
| Format 4 | $448T_s$ | $4096T_s$ | $614T_s$ |

In the random access preamble format shown in Table 1, Format 0 to Format 3 are transmitted in the normal uplink subframe, the length of the ZC sequence (NZC) is 839, the Format 4 is transmitted in the UpPTS, and the NZC is 139.

In the current LTE system, the values of the cyclic shift quantities (NCS) under every random access preamble format are configured; by taking Format 0 to Format 3 as examples, the cyclic shift quantity (NCS) set is configured, divided into a restricted set and an unrestricted set; as to Format 0 to Format 3, the values of the NCS are shown in Table 2, wherein, 0 in the unrestricted set represents 839.

TABLE 2

| NCS configuration | NCS value | |
|---|---|---|
| | Unrestricted set | Restricted set |
| 0 | 0 | 15 |
| 1 | 13 | 18 |
| 2 | 15 | 22 |
| 3 | 18 | 26 |
| 4 | 22 | 32 |
| 5 | 26 | 38 |
| 6 | 32 | 46 |
| 7 | 38 | 55 |
| 8 | 46 | 68 |
| 9 | 59 | 82 |
| 10 | 76 | 100 |
| 11 | 93 | 128 |
| 12 | 119 | 158 |
| 13 | 167 | 202 |
| 14 | 279 | 237 |
| 15 | 419 | — |

In the current LTE system, in order to withstand the frequency offset generated by the high-speed movement of the terminal, the cyclic shift restriction is used, that is, when the terminal is in a high-speed mobile environment, only the NCS values in the restricted set in Table 2 are allowed to use. While the NCS values in the restricted set are generally smaller, the greatest is only 237, and such a NCS value determines a smaller cell coverage radius. So, the current random access technology cannot satisfy the requirement of the high-speed movement of the terminal and the larger cell coverage radial simultaneously.

SUMMARY OF THE INVENTION

The embodiment of the present document provides a more perfect random access method and random access system for a terminal in a high-speed mobile environment, to solve the technical problem that the terminal can obtain a greater cell coverage radius in the high-speed movement.

In order to solve the above-mentioned technical problem, the embodiment of the present document adopts the following technical scheme.

A random access method for a terminal in a high-speed mobile environment comprises: selecting a random access preamble format according to a preset cell coverage radius target value; judging whether using a restricted set of cyclic shift quantities pre-configured satisfies a requirement of the cell coverage radius target value under the selected random access preamble format; if the restricted set does not satisfy the requirement of the cell coverage radius target value, then selecting a cyclic shift quantity which satisfies the requirement of the cell coverage radius target value from an unrestricted set of the cyclic shift quantities pre-configured; and generating a random access signal according to the selected cyclic shift quantity and a pre-configured mother code, and performing access using the random access signal.

Preferably, the step of selecting a random access preamble format according to a preset cell coverage radius target value comprises: calculating a maximum cell coverage radius supported by a corresponding format according to a length of a guard interval in a random access subframe under every random access preamble format; and selecting a random access preamble format of which the supported maximum cell coverage radius is greater than or equal to the cell coverage radius target value.

Preferably, the step of judging whether using a restricted set of cyclic shift quantities pre-configured satisfies a requirement of the cell coverage radius target value under the selected random access preamble format comprises: calculating the maximum cell coverage radius supported by the selected random access preamble format according to a maximum cyclic shift quantity value in the restricted set; and if the calculated maximum cell coverage radius is less than the cell coverage radius target value, then the restricted set not satisfying the requirement of the cell coverage radius target value.

Preferably, the step of selecting a cyclic shift quantity which satisfies the requirement of the cell coverage radius target value from an unrestricted set of the cyclic shift quantities pre-configured comprises: calculating a minimum cyclic shift quantity value which satisfies the requirement of the cell coverage radius target value under the selected random access preamble format according to the cell coverage radius target value; and selecting a cyclic shift quantity which is greater than or equal to the minimum value from the unrestricted set.

Preferably, the step of selecting a cyclic shift quantity which satisfies the requirement of the cell coverage radius target value from an unrestricted set of the cyclic shift quantities pre-configured comprises: preselecting at least one cyclic shift quantity which is greater than the maximum cyclic shift quantity value of the restricted set from the unrestricted set; calculating the maximum cell coverage radius supported by the selected random access preamble format according to every preselected cyclic shift quantity respectively; and selecting the cyclic shift quantity of which the obtained maximum cell coverage radius is greater than or equal to the cell coverage radius target value from the preselected cyclic shift quantities.

Preferably, before generating a random access signal according to the cyclic shift quantity and the pre-configured mother code, a mother code configuration step is further comprised, comprising: preconfiguring a mother code table, wherein, the mother code table records a mapping relationship among a number of mother codes required by cell networking, a logic root sequence index group and a cyclic shift value corresponding to a Doppler frequency shift, and each logic root sequence index group comprises logic root sequence indexes whose number is the same as the number of mother codes required by the cell networking;

searching for a corresponding logic root sequence index group from the mother code table according to the number of mother codes practically required by cell networking, and selecting a logic root sequence index from the logic root sequence index group; and generating a corresponding mother code according to the selected logic root sequence index.

A random access system comprises a base station and a terminal in a high-speed mobile environment, wherein: the base station is configured to select a random access preamble format according to a preset cell coverage radius target value; and the terminal is configured to judge whether using a restricted set of cyclic shift quantities pre-configured satisfies a requirement of the cell coverage radius target value under the random access preamble format selected by the base station; if the restricted set does not satisfy the requirement of the cell coverage radius target value, then select a cyclic shift quantity which satisfies the requirement of the cell coverage radius target value from an unrestricted set of the cyclic shift quantities pre-configured; and generate a random access signal according to the selected cyclic shift quantity and a pre-configured mother code, and perform access using the random access signal.

Preferably, the base station comprises a first calculation module and a first selection module, wherein: the first calculation module is configured to calculate a maximum cell coverage radius supported by a corresponding format according to a length of a guard interval in a random access subframe under every random access preamble format; and the first selection module is configured to select a random access preamble format of which the supported maximum cell coverage radius is greater than or equal to the cell coverage radius target value.

Preferably, the terminal comprises a second calculation module and a first judgment module, wherein: the second calculation module is configured to calculate the maximum cell coverage radius supported by the selected random access preamble format according to a maximum cyclic shift quantity value in the restricted set; and the first judgment module is configured to determine that the restricted set does not satisfy the requirement of the cell coverage radius target value in a condition that the maximum cell coverage radius calculated by the second calculation module is less than the cell coverage radius target value.

Preferably, the terminal comprises a third calculation module and a second selection module, wherein: the third calculation module is configured to calculate a minimum cyclic shift quantity value which satisfies the requirement of the cell coverage radius target value under the selected random access preamble format according to the cell coverage radius target value; and the second selection module is configured to select a cyclic shift quantity which is greater than or equal to the minimum value from the unrestricted set.

Preferably, the terminal comprises a third selection module, a fourth calculation module and a fourth selection module, wherein: the third selection module is configured to preselect at least one cyclic shift quantity which is greater than the maximum cyclic shift quantity value of the restricted set from the unrestricted set; the fourth calculation module is configured to calculate the maximum cell coverage radius supported by the selected random access preamble format according to every preselected cyclic shift quantity respectively; and the fourth selection module is configured to select the cyclic shift quantity of which the obtained maximum cell coverage radius is greater than or equal to the cell coverage radius target value from the preselected cyclic shift quantities.

Preferably, the base station further comprises a mother code table configuration module, a mother code table searching module and a mother code table generation module, wherein: the mother code table configuration module is configured to preconfigure a mother code table, wherein, the mother code table records a mapping relationship among a number of mother codes required by cell networking, a logic root sequence index group and a cyclic shift value corresponding to a Doppler frequency shift, and each logic root sequence index group comprises logic root sequence indexes whose number is the same as the number of mother codes required by the cell networking;

the mother code table searching module is configured to search for a corresponding logic root sequence index group from the mother code table according to the number of mother codes practically required by cell networking, and select a logic root sequence index from the logic root sequence index group; and the mother code table generation module is configured to generate a corresponding mother code according to the selected logic root sequence index.

The beneficial effect of the embodiment of the present document is: when a terminal is in in a high-speed mobile environment, if using a restricted set of cyclic shift quantities pre-configured under a selected random access preamble format cannot satisfy the requirement of the cell coverage radius target value, then selecting the cyclic shift quantity which satisfies the requirement of the cell coverage radius target value from the unrestricted set of the cyclic shift quantities pre-configured, and generating the random access signal according to the cyclic shift quantity and the pre-configured mother code. In this way, on the premise of not changing the frame structure and the system processing, the high-speed movement of the terminal is satisfied, and a greater cell coverage radius can also be obtained.

PREFERRED EMBODIMENTS OF THE INVENTION

The embodiment of the present document is described in detail with reference to the accompanying drawings hereinafter. It should be illustrated that, in the case of not conflicting, the embodiments in the present application and features in these embodiments can be combined with each other.

In an embodiment of the present document, when a terminal is in a high-speed mobile environment, if using a restricted set of cyclic shift quantities pre-configured is unable to satisfy a requirement of the cell coverage radius target value under a selected random access preamble format, then a cyclic shift quantity which satisfies the requirement of the cell coverage radius target value is selected from an unrestricted set of the cyclic shift quantities pre-configured; and a random access signal is generated according to the cyclic shift quantity and a pre-configured mother code. The embodiment of the present document needs to set the cell coverage radius target value and the mother code required by the cell networking according to the actual conditions at first; the cell coverage radius target value is used for determining the selection of the cyclic shift quantity, and the configuration of the mother code required by the cell networking follows the following principles that: the mother code with a smaller du value is used, and the mother codes of neighbor cells are not repeated so as to reduce the adjacent cell interference. For Format 0 to Format 3, in the embodiment of the present document, the restricted set and the unrestricted set of the cyclic shift quantities pre-configured include but not limited to what is shown in Table 2; the restricted set shown in Table 2 is for NCS values of the terminal in the high-speed mobile environment in the relevant access technology, and the unrestricted set is for NCS values of the terminal in the low-speed mobile environment in the relevant access technology.

Figure 2:
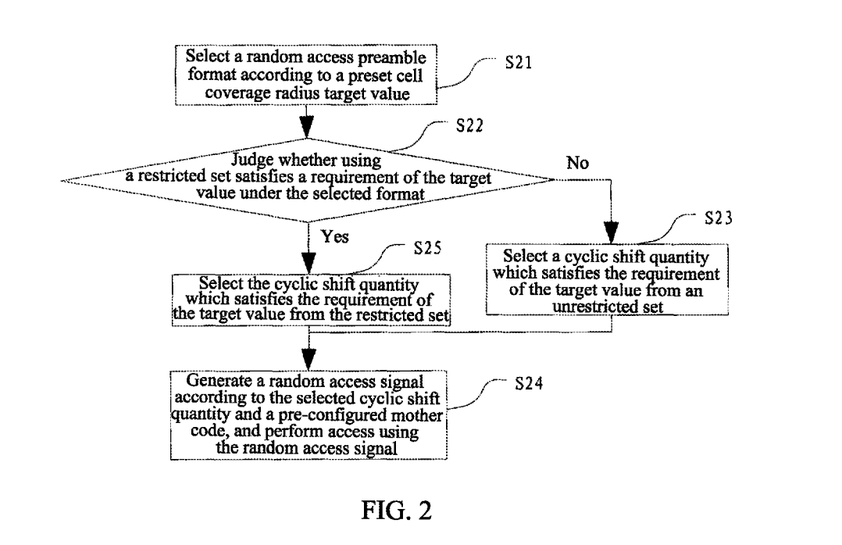
FIG. 2 is a flow chart of a random access method for a terminal in a high-speed mobile environment provided by an embodiment of the present application.

FIG. 2 is a flow chart of a random access method for a terminal in a high-speed mobile environment provided by an embodiment of the present application, after setting the cell coverage radius target value and the mother code required by the cell networking according to the actual conditions, the following steps, S21 to S24, are included:

in S21, a base station selects a random access preamble format according to a preset cell coverage radius target value;

in S22, a terminal judges whether using a restricted set of cyclic shift quantities pre-configured satisfies a requirement of the cell coverage radius target value under the selected random access preamble format; if not satisfying, then it is to proceed to step S23;

in S23, the terminal selects a cyclic shift quantity which satisfies the requirement of the cell coverage radius target value from an unrestricted set of the cyclic shift quantities pre-configured; and in S24, the terminal generates a random access signal according to the selected cyclic shift quantity and a pre-configured mother code, and performs access using the random access signal.

Alternatively, in the above-mentioned procedure, if a judgment result in step S22 is that using the restricted set of the cyclic shift quantities pre-configured satisfies the requirement of the cell coverage radius target value, then the following steps can also be included:

in S25, the terminal selects the cyclic shift quantity which satisfies the requirement of the cell coverage radius target value from the restricted set, and then it is to proceed to step S24.

Step S23 includes: selecting any cyclic shift quantity which satisfies the requirement of the cell coverage radius target value from the unrestricted set, or selecting a minimum cyclic shift quantity which satisfies the requirement of the cell coverage radius target value from the unrestricted set. Likewise, step S25 includes: selecting any cyclic shift quantity which satisfies the requirement of the cell coverage radius target value from the restricted set, or selecting a minimum cyclic shift quantity which satisfies the requirement of the cell coverage radius target value from the restricted set.

The cell coverage radius is related to the GT and the cyclic shift quantity of the sequence. Supposing that the cell coverage radius determined by the cyclic shift quantity of the sequence is CellRadius1 and the cell coverage radius determined by the GT is CellRadius2, then the cell coverage radius CellRadius codetermined by the GT and the cyclic shift quantity of the sequence is: CellRadius=min(CellRadius1,CellRadius2), that is, the smaller one of CellRadius1 and CellRadius2.

Wherein, the formula for calculating the cell coverage radius determined by the cyclic shift quantity of the sequence is:

$$CellRadius1 = 0.5 \times \frac{N_{cs}}{N_{zc}} \times T_{SEQ} \times \frac{0.01 \text{ s}}{307200T_s} \times 3 \times 10^5 \text{ km/s}, \quad \text{formula 1)}$$

The cyclic shift quantity determines whether the cell edge user can distinguish different cyclic shift window, and the selection of the cyclic shift quantity must guarantee that: the relevant peak values of the preamble sequence and the local sequence of the cell edge user fall in the time window corresponding to the cyclic shift quantity, and the length of the time window is $T_{Ncs}$, and $$T_{Ncs} = \frac{N_{cs}}{N_{zc}} \times T_{SEQ} \times \frac{0.01 \text{ s}}{307200T_s}.$$

Because there has been a delay D1 from the time reference of the UE after the downlink synchronization is complete, and there is also a delay D2 after the UE sends the random access subframe to the base station, and D=D1≈D2, so the time window $T_{Ncs}$ corresponding to one cyclic shift will absorb two delays (2D), thus the supported cell radius should be reduced by half too. Therefore, the formula for calculating the cell coverage radius determined by $T_{Ncs}$ can be: CellRadius1=0.5×$T_{Ncs}$×3×10$^5$ km/s, and the formula 1) can be obtained by putting the formula $$T_{Ncs} = \frac{N_{cs}}{N_{zc}} \times T_{SEQ} \times \frac{0.01 \text{ s}}{307200T_s}$$

into the formula CellRadius1=0.5×$T_{Ncs}$×3×10$^5$ km/s.

In formula 1), the NZC is the length of the ZC sequence, and for Format 0 to Format 3 in Table 1, the NZC is 839, and for Format 4, the NZC is 139. The TSEQ is the Sequence length (or, the number of sampling points of the preamble sequence); for any random access preamble format, its value is known, as shown in Table 1; although the TSEQs of Format2 and Format3 are 2*24576Ts in Table 1, practically, it is to repeat two Preamble blocks; when putting into the formulae 1, the TSEQs of Format 0 to Format all are 324576Ts, and the TSEQ value of Format 4 is 4096Ts, and the NCS is the cyclic shift quantity; for any random access preamble format, as shown in Table 2, its value can be a plurality of values, and one of them needs to be selected. Therefore, after selecting the random access preamble format, the NZC and the TSEQ in formula 1) are all known numbers, only the Ncs and the cell coverage radius CellRadius1 are unknown numbers, and the cell coverage radius CellRadius1 is in direct proportion to the value of the Ncs.

The formula for calculating the cell coverage radius determined by the GT can be:

$$CellRadius2 = 0.5 \times T_{GT} \times \frac{0.01 \text{ s}}{307200T_s} \times 3 \times 10^5 \text{ km/s}, \quad \text{formula 2)}$$

In formula 2), the TGT is the length of the guard interval in the random access subframe (or the number of sampling points of the guard interval; for any random access preamble format, its value is known, as shown in Table 1: the TGT value corresponding to Format 0 is 2976Ts, the TGT value corresponding to Format 1 is 15840Ts, the TGT value corresponding to Format 2 is 6048Ts, the TGT value corresponding to Format 3 is 21984Ts, and the TGT value corresponding to Format 4 is 614Ts. Therefore, according to the TGT corresponding to every random access preamble format, the cell coverage radius CellRadius2 supported by every random access preamble format can be calculated.

Therefore, step S21 can be specifically:

in S211, the base station calculates the maximum cell coverage radius supported by the corresponding format according to the length of the guard interval in the random access subframe (or the number of sampling points of the guard interval) TGT under every random access preamble format.

The TGT value corresponding to every random access preamble format in Table 1 is used, and according to formula 2), the maximum cell coverage radius supported by Format 0 to Format 4 are calculated respectively, and the result of the calculation is shown in Table 3:

TABLE 3

| random access preamble format | $T_{CP}$ | $T_{SEQ}$ | $T_{GT}$ | Maximum cell coverage radius supported |
|---|---|---|---|---|
| Format 0 | 3168Ts | 24576Ts | 2976Ts | 14.5 km |
| Format 1 | 21024Ts | 24576Ts | 15840Ts | 77 km |
| Format 2 | 6240Ts | 2*24576Ts | 6048Ts | 30 km |
| Format 3 | 21024Ts | 2*24576Ts | 21984Ts | 100 km |
| Format 4 | 448Ts | 4096Ts | 614Ts | 3 km |

In S212, the base station selects the random access preamble format of which the supported maximum cell coverage radius is greater than or equal to the preset cell coverage radius target value.

Taking the maximum cell coverage radius supported by every random access preamble format shown in Table 3 as an example, supposing that the preset cell coverage radius target value is 60 km, then only the maximum cell coverage radius supported by Format 1 and Format 3 satisfy the following conditions: greater than or equal to 60 km, so, step S212 can select any one of Format 1 and Format 3.

It can be known from formula 1), after selecting the random access preamble format, the NZC and the TSEQ in the formula 1) are all known numbers, and only the Ncs and the cell coverage radius CellRadius1 are unknown numbers, and the cell coverage radius CellRadius1 is in direct proportion to the value of the Ncs. Therefore, for the restricted set, if the cell coverage radius CellRadius1 obtained according to the maximum value of the cyclic shift quantity (Ncs-Max) in the restricted set cannot reach the preset cell coverage radius target value, then all other cyclic shift quantities in the restricted set cannot make the cell coverage radius reach the cell coverage radius target value. Therefore, in step S22, judging whether using the restricted set of the cyclic shift quantities pre-configured satisfies the requirement of the cell coverage radius target value under the format selected in step S21 can be specifically:

in S221, the terminal selects the Ncs-Max from the restricted set;

in S222, the terminal substitutes the NZC and the TSEQ corresponding to the Ncs-Max and the random access preamble format selected in step S21 into formulae 1), and obtains the cell coverage radius CellRadius1 corresponding to the Ncs-Max;

in S223, the terminal judges whether the cell coverage radius CellRadius1 obtained in step S222 is less than the preset cell coverage radius target value; if CellRadius1 is less than the preset cell coverage radius target value, then it is illustrated that all cyclic shift quantities in the restricted set cannot make the cell coverage radius reach the target, that is, the restricted set does not satisfy the requirement of the cell coverage radius target value, and it is to proceed to step S23; if the CellRadius1 is not less than the preset cell coverage radius target value, then it is illustrated that there is a cyclic shift quantity which satisfies the requirement of the cell coverage radius target value in the restricted set, that is, the restricted set satisfies the requirement of the cell coverage radius target value, and it is to proceed to step S25.

The ways of selecting the NCS which satisfies the requirement of the cell coverage radius target value from the unrestricted set of the cyclic shift quantities pre-configured in step S23 include but not limited to the following enumerated steps:

wherein, one of the ways includes S231a and S232a:

in S231a, the terminal substitutes the NZC and the TSEQ corresponding to the cell coverage radius target value and the random access preamble format selected in step S21 into formulae 1), and calculates the minimum value of the cyclic shift quantity (Ncs-Min) which satisfies the requirement of the cell coverage radius target value under the selected random access preamble format;

in S232a, the terminal selects the cyclic shift quantity which is greater than or equal to the Ncs-Min from the unrestricted set, because the cell coverage radius is in direct proportion to the value of the Ncs in the formula 1), for the unrestricted set, with respect to any cyclic shift quantity which is greater than or equal to the Ncs-Min, all cell coverage radius CellRadius1 obtained can be greater than or equal to the cell coverage radius target value.

Another way includes S231b, S232b and S233b:

in S231b, the terminal preselects the cyclic shift quantity which is greater than the Ncs-Max in the restricted set from the unrestricted set, and the number the cyclic shift quantities preselected in the step may be one or more;

because the cell coverage radius is in direct proportion to the value of the Ncs in the formula 1), for the unrestricted set, only when the cyclic shift quantity which is greater than the Ncs-Max is substituted into formulae 1), the cell coverage radius CellRadius1 which is greater than or equal to the cell coverage radius target value can be obtained;

in S232b, the terminal substitutes every preselected cyclic shift quantity, combining the NZC and the TSEQ corresponding to the random access preamble format selected in step S21, into formulae 1), and calculates the maximum cell coverage radius supported by the random access preamble format when the cyclic shift quantity is the current value;

in S233b, the terminal selects the cyclic shift quantity of which the obtained maximum cell coverage radius is greater than or equal to the cell coverage radius target value from the preselected cyclic shift quantities.

Similarly, the ways of selecting the cyclic shift quantity which satisfies the requirement of the cell coverage radius target value from the restricted set in step S25 can refer to the above-mentioned steps S231 to S232, or S231b to S233b.

In another embodiment, before step S24, the following mother code configuration steps can further be included:

in step A, the terminal preconfigures a mother code table, wherein, the mother code table records a mapping relationship among a number of mother codes required by cell networking, a logic root sequence index group and a cyclic shift value corresponding to a Doppler frequency shift, as shown in Table 4;

in step B, the terminal searches for a corresponding logic root sequence index group from the mother code table according to the number of mother codes practically required by cell networking, and selects a logic root sequence index from the logic root sequence index group;

in step C, the terminal generates a corresponding mother code according to the selected logic root sequence index.

TABLE 4

| number of mother codes require by the cell networking | cyclic shift value corresponding to a Doppler frequency shift (du value) | logic root sequence index group |
|---|---|---|
| 6 | 1 2 3 | 22 23 826 827 830 831 |
| 8 | 1 4 2 3 | 22 23 6 7 826 827 830 831 |
| 10 | 1 4 5 2 3 | 22 23 6 7 8 9 826 827 830 831 |

TABLE 4-continued

| number of mother codes require by the cell networking | cyclic shift value corresponding to a Doppler frequency shift (du value) | logic root sequence index group |
|---|---|---|
| 12 | 1 4 5 6 2 3 | 22 23 6 7 8 9 2 3 826 827 830 831 |
| 14 | 1 4 5 6 7 2 3 | 22 23 6 7 8 9 2 3 4 5 826 827 830 831 |
| 16 | 1 4 5 6 7 8 2 3 | 22 23 6 7 8 9 2 3 4 5 12 13 826 827 830 831 |
| ... | ... | ... |

In Table 4, the number of the logic root sequence indexes shown by every logic root sequence index group is the same as the number of mother codes in the first column; taking the number of mother codes 6 as an example, the corresponding logic root sequence index group includes 6 logic root sequence indexes, which are "22", "23", "826", "827", "830" and "831" respectively.

Table 4 only shows the parts with smaller du values in the total mother code table. In the high-speed mobile mode, the system will produce great frequency shift; the correlation peak of the random access ZC sequence will have a fixed shift of du/−du; according to the stipulations of 3GPP TS 36.211 protocol:

$$d_u = \begin{cases} p & 0 \le p < N_{ZC}/2 \\ N_{ZC} - p & \text{otherwise} \end{cases},$$

and (pu)mod $N_{zc}$=1; in order to reduce the error caused by the peak shift, the Time Adjustment (TA) estimation offset can be reduced by selecting the mother code value. When a fixed mother code is selected, there will be a fixed du value corresponding to it, therefore, before the step B, the total mother code table can be traversed to select the parts with smaller du values at first, and in step B, the mother code can be selected from parts of the mother codes with the smaller du values. In this way, on the premise of not changing the existing frame format and processing mode, the high-speed mobile environment of the UE is satisfied, the cell coverage radius is expended, and the TA estimation offset is reduced. Therefore, in the practical application, when the UE needs to access, there are several following ways for selecting the mother code, for example: randomly selecting a logic root sequence index from the total mother code table directly to generate the mother code; or searching for a corresponding logic root sequence index group from the total mother code table according to the number of mother codes practically required by the cell networking, and selecting one logic root sequence index from the logic root sequence index group to generate the mother code; or selecting the parts with smaller du values from the total mother code table at first, and then randomly selecting one logic root sequence index from the parts of the mother codes with smaller du values to generate the mother code; or preferably, selecting the parts with smaller du values from the total mother code table at first, and then searching for a corresponding logic root sequence index group from the parts of the mother codes with smaller du values according to the number of mother codes practically required by the 1 cell networking, and selecting one logic root sequence index from the logic root sequence index group to generate the mother code.

After generating the mother code, the random access signal is generated according to the cyclic shift quantity obtained in step S23 or step S25 and that mother code, and the access is performed.

Figure 3:
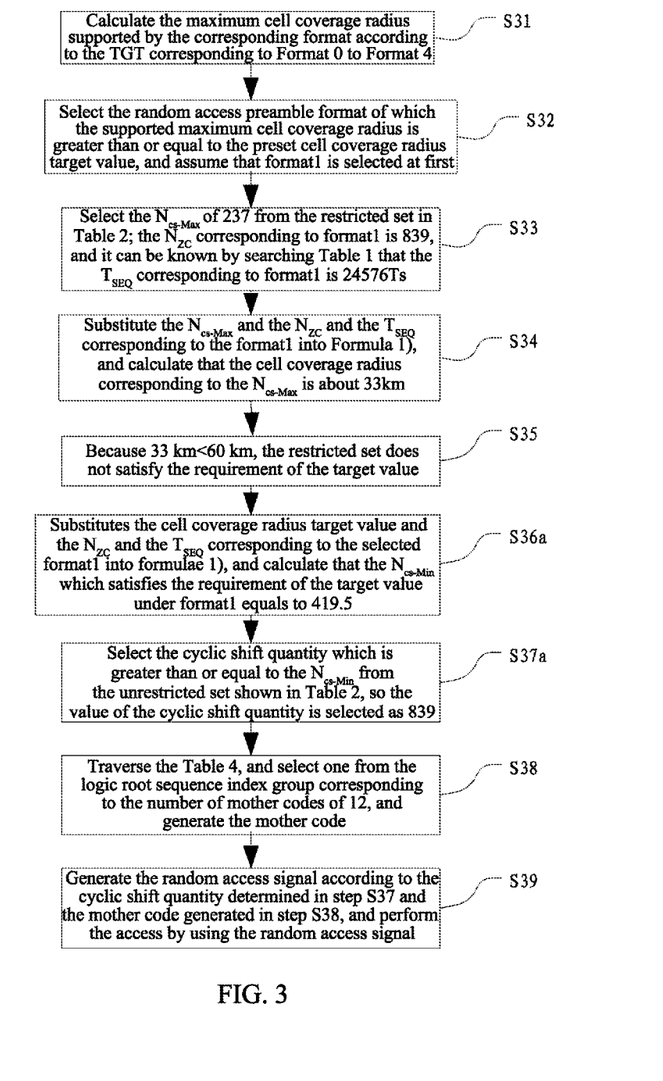
FIG. 3 is a flow chart of a random access method for a terminal in a high-speed mobile environment provided by another embodiment of the present application.

It is described by taking the realization of the random access in which the cell coverage radius target value is 60 km as an example hereinafter, and the random access procedure is shown in FIG. 3, including the following steps:

in S31, the base station calculates the maximum cell coverage radius supported by the corresponding format according to the length of the guard interval in the random access subframe (or, the number of sampling points of the guard interval) TGT of Format 0 to Format 4 in Table 1, or searches Table 3 directly;

in S32, the base station selects the random access preamble format of which the supported maximum cell coverage radius is greater than or equal to the preset cell coverage radius target value. The system requires the cell coverage radius target value to be 60 km; according to the cell coverage radius supported by different formats shown in Table 3, only the maximum cell coverage radiuses supported by format1 and format3 are greater than or equal to 60 km, so format1 or format3 can be selected here, and it is assumed that format1 is selected at first. If Format2 or Format3 is selected, though its TSEQ is 2*24576Ts in Table 1, for formula 1, the substituted TSEQ is 24576Ts;

in S33, the terminal selects the Ncs-Max from the restricted set of the cyclic shift quantities pre-configured in Table 2; it can be known from Table 2 that the Ncs-Max in the restricted set is 237, the NZC corresponding to format1 is 839, and it can be known through searching Table 1 that the TSEQ corresponding to format1 is 24576Ts;

in S34, the terminal substitutes the above-mentioned Ncs-Max, the NZC and the TSEQ corresponding to the format1 into Formula 1), and obtains:

$$CellRadius1 = 0.5 \times \frac{237}{839} \times 24576T_s \times \frac{0.01 \text{ s}}{307200T_s} \times 3 \times 10^5 \text{ km/s} \approx 33$$

it can be know that the cell coverage radius CellRadius1 corresponding to the Ncs-Max is obtained probably as 33 km;

in S35, because 33 km<60 km, it is illustrated that all cyclic shift quantities in the restricted set cannot make the cell coverage radius reach the target, that is, the restricted set does not satisfy the requirement of the cell coverage radius target value, and it is to proceed to step S36a;

in S36a, the terminal substitutes the NZC and the TSEQ corresponding to the format1 selected in step S32 into formulae 1) and the cell coverage radius target value, that is, substitutes the cell coverage radius target value 60 km, NZC=839, TSEQ=24576Ts into formulae 1), and obtains:

$$60 \text{ km} = 0.5 \times \frac{N_{cs-Min}}{839} \times 24576T_s \times \frac{0.01 \text{ s}}{307200T_s} \times 3 \times 10^5 \text{ km/s},$$

and calculates that the Ncs-Min satisfying the requirement of the cell coverage radius target value under the format1 equals to 419.5;

in S37a, the terminal selects the cyclic shift quantity which is greater than or equal to the Ncs-Min from the unrestricted set shown in Table 2. It can be known by searching Table 2 that only 839 is greater than 419.5, so, the value of the cyclic shift quantity is selected as 839. Because the cell coverage radius is in direct proportion to the value of the Ncs in formula 1), and when the cyclic shift quantity is 419.5, the obtained cell coverage radius CellRadius1 equals to the cell coverage radius target value, therefore, when the cyclic shift quantity is 839, the obtained cell coverage radius is certainly greater than the cell coverage radius target value;

in S38, if the number of mother codes practically required by the cell networking is 12, the terminal searches Table 4, and randomly selects one from the logic root sequence index group corresponding to the number of mother codes of 12, and generates the mother code;

in S39, the terminal generates the random access signal according to the cyclic shift quantity determined in step S37 and the mother code generated in step S38, and performs the access by using the random access signal.

In the present embodiment, the random access uses the format of format1 and makes the value of the cyclic shift quantity to be 839, and the supported cell coverage radius reaches the cell coverage radius target value 60 km or over at this moment, and reduces the TA estimation offset.

In step S38, the logic root sequence index can also be randomly selected from the total mother code table or part of the mother codes with smaller du values, for example, randomly selecting any of the logic root sequence index group corresponding to the number of the mother codes of 16.

Steps S36a to S37a can be replaced by the following steps S36b to S37b:

in S36b, the cyclic shift quantity which is greater than the Ncs-Max in the restricted set is preselected from the unrestricted set shown in Table 2, because the Ncs-Max in the restricted set is 237, the values of the cyclic shift quantities which can be preselected from the unrestricted set shown in Table 2 in this step can be 279, 419 and 839;

because the cell coverage radius CellRadius1 in the formula 1) is in direct proportion to the value of the Ncs, therefore, for the unrestricted set, only when the cyclic shift quantity which is greater than the 237 is substituted into formulae 1), the cell coverage radius CellRadius1 which is greater than or equal to the cell coverage radius target value can be obtained;

in S37b, every preselected cyclic shift quantity combining the NZC and the TSEQ corresponding to the format1 selected in step S32 is substituted into formulae 1), and the maximum cell coverage radius supported by the random access preamble format is calculated;

specifically, the cyclic shift quantity=279, the NZC=839 corresponding to Format1, and TSEQ=24576Ts corresponding to Format1 are substituted into formula 1), and it can be obtained:

$$CellRadius1 = 0.5 \times \frac{279}{839} \times 24576T_s \times \frac{0.01 \text{ s}}{307200T_s} \times 3 \times 10^5 \text{ km/s},$$

and it is calculated that the maximum cell coverage radius supported by format1 determined by the cyclic shift quantity is about 39 km when the cyclic shift quantity=279.

The cyclic shift quantity=419, the NZC=839 corresponding to the Format1, and TSEQ=24576Ts corresponding to Format1 are substituted into formula 1), and it is obtained:

$$CellRadius1 = 0.5 \times \frac{419}{839} \times 24576T_s \times \frac{0.01 \text{ s}}{307200T_s} \times 3 \times 10^5 \text{ km/s},$$

and it is calculated that the maximum cell coverage radius supported by format1 determined by the cyclic shift quantity is about 59 km when the cyclic shift quantity=419.

The cyclic shift quantity=839, NZC=839 corresponding to the Format1, and TSEQ=24576Ts corresponding to Format1 are substituted into formula 1), and it is obtained:

$$CellRadius1 = 0.5 \times \frac{419}{839} \times 24576 T_s \times \frac{0.01\ s}{307200 T_s} \times 3 \times 10^5\ km/s,$$

and it is calculated that the maximum cell coverage radius supported by format1 determined by the cyclic shift quantity is about 120 km when the cyclic shift quantity=839.

From the preselected cyclic shift quantity, the obtained maximum cell coverage radius which is greater than or equal to the cyclic shift quantity of the cell coverage radius target value is selected; in the embodiment, only when the cyclic shift quantity=839, the maximum cell coverage radius supported by format1 is greater than the cell coverage radius target value of 60 km, so the cyclic shift quantity=839 is selected.

Figure 4:
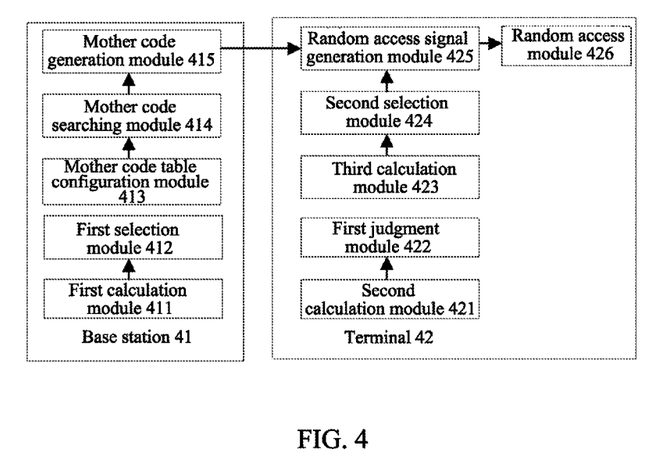
FIG. 4 is a diagram of a random access system provided by an embodiment of the present application.

The embodiment of the present document further provides a random access system. As shown in FIG. 4, a random access system provided by the embodiment of the present document comprises a base station 41 and a terminal 42 in a high-speed mobile environment, wherein: the base station 41 is configured to select a random access preamble format according to a preset cell coverage radius target value; and the terminal 42 is configured to judge whether using a restricted set of cyclic shift quantities pre-configured satisfies a requirement of the cell coverage radius target value under the selected random access preamble format; if the restricted set does not satisfy the requirement of the cell coverage radius target value, then select a cyclic shift quantity which satisfies the requirement of the cell coverage radius target value from an unrestricted set of the cyclic shift quantities pre-configured; and generate a random access signal according to the cyclic shift quantity and a pre-configured mother code, and perform access using the random access signal.

The base station 41 can comprise a first calculation module 411 and a first selection module 412, wherein: the first calculation module 411 is configured to calculate a maximum cell coverage radius supported by a corresponding format according to a length of a guard interval in a random access subframe under every random access preamble format; and the first selection module 412 is configured to select a random access preamble format of which the supported maximum cell coverage radius is greater than or equal to the cell coverage radius target value. The base station 41 can further comprise a mother code table configuration module 413, a mother code table searching module 414 and a mother code table generation module 415, wherein, the mother code table configuration module 413 is configured to preconfigure a mother code table, wherein, the mother code table records a mapping relationship among a number of mother codes required by cell networking, a logic root sequence index group and a cyclic shift value corresponding to a Doppler frequency shift, and each logic root sequence index group comprises logic root sequence indexes whose number is the same as the number of mother codes required by the cell networking; the mother code table searching module 414 is configured to search for a corresponding logic root sequence index group from the mother code table according to the number of mother codes practically required by cell networking, and select a logic root sequence index from the logic root sequence index group; and the mother code table generation module 415 is configured to generate a corresponding mother code according to the selected logic root sequence index.

The terminal can comprise a second calculation module 421 and a first judgment module 422, wherein, the second calculation module 421 is configured to calculate the maximum cell coverage radius supported by the selected random access preamble format according to a maximum cyclic shift quantity value in the restricted set; and the first judgment module 422 is configured to determine that the restricted set does not satisfy the requirement of the cell coverage radius target value in a condition that the maximum cell coverage radius calculated by the second calculation module is less than the cell coverage radius target value.

The terminal can further comprise a third calculation module 423 and a second selection module 424, wherein, the third calculation module 423 is configured to calculate a minimum cyclic shift quantity value which satisfies the requirement of the cell coverage radius target value under the selected random access preamble format according to the cell coverage radius target value; and the second selection module 424 is configured to select a cyclic shift quantity which is greater than or equal to the minimum value from the unrestricted set. Alternatively, the terminal 42 can further comprise a third selection module, a fourth calculation module and a fourth selection module, wherein, the third selection module is configured to preselect at least one cyclic shift quantity which is greater than the maximum cyclic shift quantity value of the restricted set from the unrestricted set; the fourth calculation module is configured to calculate the maximum cell coverage radius supported by the selected random access preamble format according to every preselected cyclic shift quantity respectively; and the fourth selection module is configured to select the cyclic shift quantity of which the obtained maximum cell coverage radius is greater than or equal to the cell coverage radius target value from the preselected cyclic shift quantities.

The terminal 42 can further comprises a random access signal generation module 425 and a random access module 426; the random access signal generation module 425 is configured to generate the random access signal according to the cyclic shift quantity selected by the terminal 42 and the pre-configured mother code of the base station; and the random access module 426 is configured to perform the access by using the random access signal.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present document is not limit to any specific form of the combination of the hardware and software.

The above-mentioned embodiments are only used to illustrate the technical scheme of the present document while not to limit, and the present document is described in details only referring to the preferable embodiments. Those skilled in the art should understand that they can make the modifications and equivalents according to the technical scheme of the present document without departing from the spirit and scope of the present document, which should be embodied in the scope of the appended claims of the present document.

INDUSTRIAL APPLICABILITY

The beneficial effect of the embodiment of the present document is: when a terminal is in in a high-speed mobile environment, if using a restricted set of cyclic shift quantities pre-configured under a selected random access preamble format cannot satisfy the requirement of the cell coverage radius target value, then selecting the cyclic shift quantity which satisfies the requirement of the cell coverage radius target value from the unrestricted set of the cyclic shift quantities pre-configured, and generating the random access signal according to the cyclic shift quantity and the pre-configured mother code. In this way, under the precondition of not changing the frame structure and the system processing, the high-speed movement of the terminal is satisfied, and a greater cell coverage radius can also be obtained.

What we claim is:

1. A random access method for a terminal in a high-speed mobile environment, comprising:

selecting a random access preamble format according to a preset cell coverage radius target value;

judging whether using a restricted set of cyclic shift quantities pre-configured satisfies a requirement of the cell coverage radius target value under the selected random access preamble format; if the restricted set does not satisfy the requirement of the cell coverage radius target value, then selecting a cyclic shift quantity which satisfies the requirement of the cell coverage radius target value from an unrestricted set of cyclic shift quantities pre-configured; and generating a random access signal according to the selected cyclic shift quantity and a pre-configured mother code, and performing access using the random access sign;

wherein, the step of selecting the random access preamble format according to the preset cell coverage radius target value comprises:

calculating a maximum cell coverage radius supported by a corresponding format according to a length of a guard interval in a random access subframe under every random access preamble format; and selecting a random access preamble format of which the supported maximum cell coverage radius is greater than or equal to the cell coverage radius target value.

2. The method according to claim 1, wherein, the step of judging whether using the restricted set of cyclic shift quantities pre-configured satisfies the requirement of the cell coverage radius target value under the selected random access preamble format comprises:

calculating a maximum cell coverage radius supported by the selected random access preamble format according to a maximum cyclic shift quantity value in the restricted set; and if the calculated maximum cell coverage radius is less than the cell coverage radius target value, then the restricted set not satisfying the requirement of the cell coverage radius target value.

3. The method according to claim 1, wherein, the step of selecting the cyclic shift quantity which satisfies the requirement of the cell coverage radius target value from the unrestricted set of cyclic shift quantities pre-configured comprises:

calculating a minimum cyclic shift quantity value which satisfies the requirement of the cell coverage radius target value under the selected random access preamble format according to the cell coverage radius target value; and selecting a cyclic shift quantity which is greater than or equal to the minimum cyclic shift quantity value from the unrestricted set.

4. The method according to claim 1, wherein, the step of selecting the cyclic shift quantity which satisfies the requirement of the cell coverage radius target value from the unrestricted set of cyclic shift quantities pre-configured comprises:

preselecting at least one cyclic shift quantity which is greater than a maximum cyclic shift quantity value of the restricted set from the unrestricted set;

calculating a maximum cell coverage radius supported by the selected random access preamble format according to every preselected cyclic shift quantity respectively; and selecting the cyclic shift quantity of which the obtained maximum cell coverage radius is greater than or equal to the cell coverage radius target value from the preselected cyclic shift quantities.

5. The method according to claim 1, wherein, before generating the random access signal according to the cyclic shift quantity and the pre-configured mother code, the method further comprises a mother code configuration step, comprising:

preconfiguring a mother code table, wherein, the mother code table records a mapping relationship among a number of mother codes required by cell networking, a logic root sequence index group and a cyclic shift value corresponding to a Doppler frequency shift, and each logic root sequence index group comprises logic root sequence indexes whose number is the same as the number of mother codes required by the cell networking;

searching for a corresponding logic root sequence index group from the mother code table according to the number of mother codes practically required by cell networking, and selecting a logic root sequence index from the logic root sequence index group; and generating a corresponding mother code according to the selected logic root sequence index.

6. A random access system, comprising a base station and a terminal in a high-speed mobile environment, wherein:

the base station is configured to select a random access preamble format according to a preset cell coverage radius target value; and the terminal is configured to judge whether using a restricted set of cyclic shift quantities pre-configured satisfies a requirement of the cell coverage radius target value under the random access preamble format selected by the base station; if the restricted set does not satisfy the requirement of the cell coverage radius target value, then select a cyclic shift quantity which satisfies the requirement of the cell coverage radius target value from an unrestricted set of cyclic shift quantities pre-configured; and generate a random access signal according to the selected cyclic shift quantity and a pre-configured mother code, and perform access using the random access sign;

wherein, the base station comprises a first calculation module and a first selection module, wherein:

the first calculation module is configured to calculate a maximum cell coverage radius supported by a corresponding format according to a length of a guard interval in a random access subframe under every random access preamble format; and the first selection module is configured to select a random access preamble format of which the supported maximum cell coverage radius is greater than or equal to the cell coverage radius target value.

7. The system according to claim 6, wherein, the terminal comprises a second calculation module and a first judgment module, wherein:
the second calculation module is configured to calculate the maximum cell coverage radius supported by the selected random access preamble format according to a maximum cyclic shift quantity value in the restricted set; and
the first judgment module is configured to determine that the restricted set does not satisfy the requirement of the cell coverage radius target value in a condition that the maximum cell coverage radius calculated by the second calculation module is less than the cell coverage radius target value.

8. The system according to claim 6, wherein, the terminal comprises a third calculation module and a second selection module, wherein:
the third calculation module is configured to calculate a minimum cyclic shift quantity value which satisfies the requirement of the cell coverage radius target value under the selected random access preamble format according to the cell coverage radius target value; and
the second selection module is configured to select a cyclic shift quantity which is greater than or equal to the minimum value from the unrestricted set.

9. The system according to claim 6, wherein, the terminal comprises a third selection module, a fourth calculation module and a fourth selection module, wherein:
the third selection module is configured to preselect at least one cyclic shift quantity which is greater than a maximum cyclic shift quantity value of the restricted set from the unrestricted set;
the fourth calculation module is configured to calculate a maximum cell coverage radius supported by the selected random access preamble format according to every preselected cyclic shift quantity respectively; and
the fourth selection module is configured to select the cyclic shift quantity of which the obtained maximum cell coverage radius is greater than or equal to the cell coverage radius target value from the preselected cyclic shift quantities.

10. The system according to claim 6, wherein, the base station further comprises a mother code table configuration module, a mother code table searching module and a mother code table generation module, wherein:
the mother code table configuration module is configured to preconfigure a mother code table, wherein, the mother code table records a mapping relationship among a number of mother codes required by cell networking, a logic root sequence index group and a cyclic shift value corresponding to a Doppler frequency shift, and each logic root sequence index group comprises logic root sequence indexes whose number is the same as the number of mother codes required by the cell networking;
the mother code table searching module is configured to search for a corresponding logic root sequence index group from the mother code table according to the number of mother codes practically required by the cell networking, and select a logic root sequence index from the logic root sequence index group; and
the mother code table generation module is configured to generate a corresponding mother code according to the selected logic root sequence index.

\* \* \* \* \*